P. KRÜGER.
COUPLING.
APPLICATION FILED JUNE 6, 1921.

1,428,596.

Patented Sept. 12, 1922.

Inventor
Paul Krüger
By Knight Bro
Attys

Patented Sept. 12, 1922.

1,428,596

UNITED STATES PATENT OFFICE.

PAUL KRÜGER, OF ESSEN, GERMANY, ASSIGNOR TO FRIED. KRUPP AKTIENGESELLSCHAFT, OF ESSEN-ON-THE-RUHR, GERMANY.

COUPLING.

Application filed June 6, 1921. Serial No. 475,287.

*To all whom it may concern:*

Be it known that I, PAUL KRÜGER, residing at Essen, Germany, a citizen of the German Republic, have invented a certain new and useful Improvement in Couplings, of which the following is a specification.

This invention relates to a screw coupling which permits of the two halves of the coupling being secured in various adjacent mutual positions in a particularly simple and reliable manner.

The invention will be described with reference to the accompanying drawings which ilustrates one embodiment of the subject-matter of the invention by way of example and in which the two parts to be coupled are formed by a crank shaft and a crank arm which can be secured in various adjacent angular positions relatively thereto.

Figure 1:
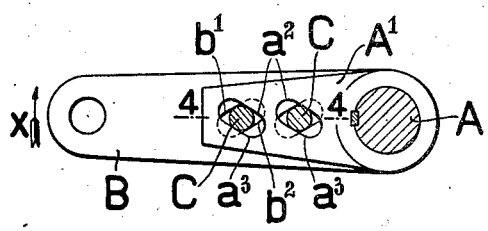
Figure 2:
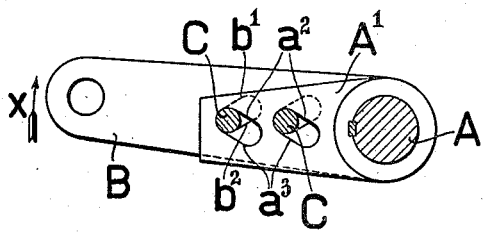
Figure 3:
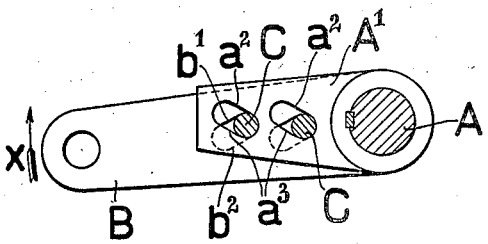

Figures 1 to 3 each show, looking in the direction of the axis of the shaft, an elevation, partially in section, of the parts to be coupled, with the crank arm in various angular positions.

Figure 4:
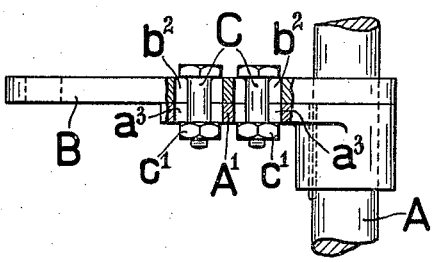
Figure 5:
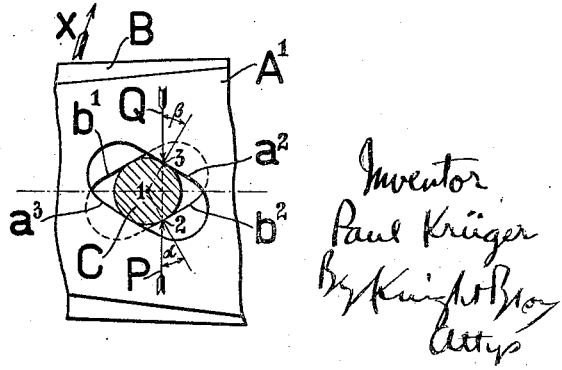

Figure 4 is a top plan corresponding to Figure 1, partially in section on the line 4—4 of Figure 1, and Figure 5 shows a portion of Figure 1 on a larger scale.

A denotes the crank shaft and B the crank arm which can be secured relatively thereto in various angular positions and which, for example, may belong to a crank gearing for operating the disharging doors of self-dischargers.

To the crank shaft A is rigidly connected an arm $A^1$ which forms one half of the coupling. This arm $A^1$ has two elongated holes or slots which are situated obliquely to its longitudinal direction. The lateral surfaces of the said holes or slots which are in advance with respect to the direction of the arrow $x$ are denoted by $a^2$ and the lateral surfaces lying opposite these surfaces $a^2$ by $a^3$. The crank arm B also has two elongated holes situated obliquely to its longitudinal direction, the lateral surfaces of which holes or slots which are in advance with respect to the direction of rotation of the arrow $x$ are denoted by $b^1$ and the lateral surfaces lying opposite these said surfaces $b^1$ by $b^2$.

Through these slots in the arms $A^1$ and B pass screw bolts C. These bolts C are provided with nuts $c^1$ (see Figure 4), by means of which the arms $a^1$ and B, which are suitably roughened on their surfaces bearing on each other, can be pressed together in any desired mutual angular position within the limits fixed by the length of the said slots. Figure 1 shows the two arms in a mutual angular position, in which their middle axial longitudinal planes coincide, Figure 2 is an angular position, in which the crank arm B is turned in the direction of the arrow $x$ and Figure 3 in a position in which the arm B is turned relatively to the arm $A^1$ in a direction opposite to that indicated by the arrow $x$.

It it be supposed that the arm $A^1$ is stationary and a force acting in the direction of the arrow $x$ is exerted on the arm B without the screw nuts $c^1$ being tightened up, for example in the position of the parts shown in Figures 1 and 5, then each screw bolt C, the axis of which in Figure 5 projects at the point 1, is pressed upon by the surface $b^2$ of the slot in the arm B at the point of contact, denoted by 2, with a force P which differs by an angle $\alpha$ (see Figure 5), which is dependent on the friction, from the perpendicular of contact 1, 2. The slot in the arm $A^1$ then exerts by its surface $a^2$ a counteracting force Q on the bolt C at the point of contact denoted by 3, which force differs from perpendicular of contact 1, 3 by an angle $\beta$ which is dependent on the friction.

The crank arm B is securely prevented from rotating in the direction indicated by the arrow $x$, if the forces P and Q acting on the bolt C are in equilibrium, that is to say these two forces must fall in a straight line, and in the isoceles triangle 1, 2, 3 the angle at 2 must be equal to $\alpha$ and the angle at 3 equal to $\beta=\alpha$. If in any mutual angular position of the arms B and $A^1$ the slots cross each other at such a small angle that the angles of the triangle at 2 and 3 are less than the angle of friction of the movement, the arm B is automatically locked against rotation in the direction of the arrow $x$. The same holds good for a rotation in the direction opposite to that indicated by the arrow $x$.

If the conditions be arranged in the manner described, the crank arm B can only be moved, when the screw nuts $c^1$ are loosened by forces which for the purpose of this movement are exerted directly on the screw bolts C together with their nuts. If the nuts be tightened up, the crank arm B is secured in an absolutely reliable manner relatively to the crank shaft A.

Claim.

1. In a coupling of the class described a pair of members to be intercoupled, said members being formed with slots so disposed that they cross each other, a coupling bolt passing through said slots, said slots being disposed at such an angle relatively to one another that the sides thereof engage said bolt when force is applied to either member thereby automatically coupling said members together.

2. In a coupling of the class described a pair of members to be coupled, said members being each formed with slots therein, which slots cross each other, a coupling bolt passing through said slots, each adjacent set of slots being disposed at such an angle relatively to one another that the longitudinal sides thereof cooperate with said bolt to automatically couple said members together when a turning force is applied to one of said members.

The foregoing specification signed at Essen, Germany, this 22nd day of April, 1921.

PAUL KRÜGER.